Patented Sept. 14, 1937

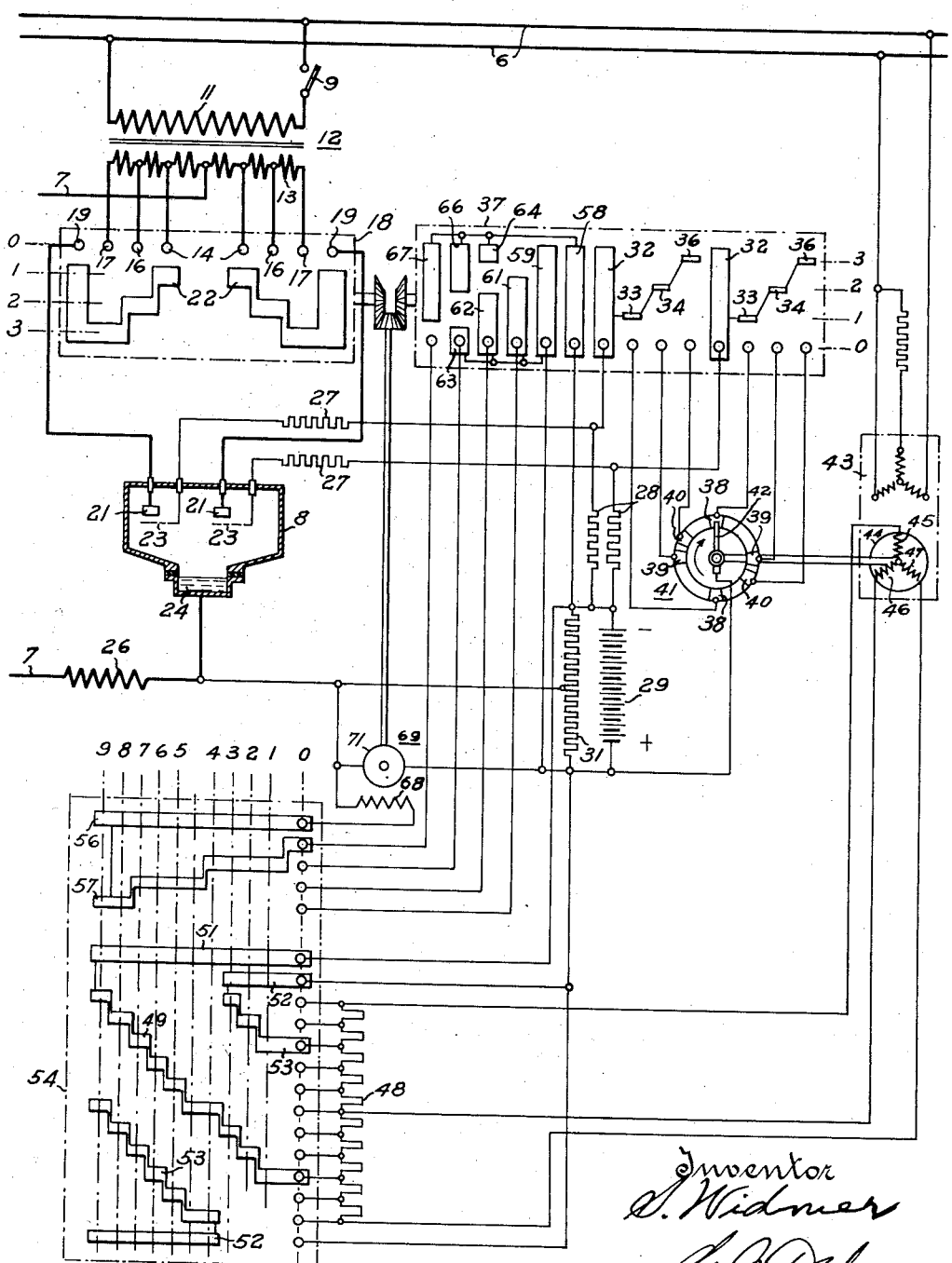

2,093,220

UNITED STATES PATENT OFFICE 2,093,220

ELECTRIC VALVE CONTROL SYSTEM

Stefan Widmer, Baden, Switzerland, assignor to Aktiengesellschaft Brown Boveri & Cie., Baden, Switzerland, a joint stock company of Switzerland Application May 7, 1934, Serial No. 724,284
In Germany May 15, 1933

22 Claims. (Cl. 175—363)

This invention relates in general to control systems and more particularly to means for controlling the flow of current through an electric translation system employing electric valves provided with means for controlling the discharge therein.

Electric valves are frequently associated with suitable circuits to constitute electric current translating systems such as alternating current rectifying, direct current inverting, frequency changing, direct current converting, motor controlling and other systems. It is then frequently desired to control such systems to permit adjusting the output voltage thereof or the current flow therethrough at continuously variable values. Such a control may generally not be obtained by means of a transformer provided with taps for the reason that, if a substantially gradual control is required, it becomes necessary to utilize an excessive number of taps which render the equipment expensive and cumbersome. A gradual control of the flow of current may be obtained by controlling the discharge within the valve by suitable mechanical, electrostatic or electromagnetic means acting within the valve. Such control is however advantageous only when a limited degree of control is required for the reason that such method of control adversely affects the efficiency of the system and the power factor of alternating current flowing therethrough. It is therefore preferable to combine these two methods of control and to control the output of the system stepwise by means of a tap changer and to further control the output of the system within such steps by acting on the discharge within the valve. The discharge controlling means are then advantageously utilized for interrupting the flow of current through the system during operation of the tap changer to avoid the necessity of using a tap changer capable of interrupting the flow of current. In addition, the controls of the tap changer and of the discharge controlling means are preferably so coordinated that the operation of the tap changer over one step thereof either leaves the output voltage of the system substantially constant or else causes such voltage to be varied to an extent less than one step of the tap changer.

It is therefore one of the objects of the present invention to provide a control system for an electric valve in which the flow of current through the valve may be coordinately controlled by step-by-step controlling means and by gradually acting controlling means.

Another object of the present invention is to provide a control system for an electric valve coordinately controlled by circuit controlling means and by discharge controlling means of the valve.

Another object of the present invention is to provide a control system for an electric valve in which the flow of current is adjusted by means of a tap changer and such flow of current is interrupted by the control electrodes of the valve during operation of the tap changer.

Another object of the present invention is to provide a control system for an electric valve in which movement of the tap changer over one step thereof varies the output voltage of the system to an extent less than the extent obtained by movement of the tap changer alone.

Objects and advantages other than those above described will be apparent from the following description when read in connection with the accompanying drawing which diagrammatically illustrates one embodiment of the present invention applied to the control of an electric valve operable for the rectification of alternating current and for the inversion of direct current.

Referring more particularly to the drawing by characters of reference, reference numeral 6 designates an alternating current line connected with a direct current line 7 through an electric translating system comprising an electric valve 8 controlling the flow of current therebetween. In the description of the present embodiment, it will be assumed that alternating current received from line 6 is to be rectified and supplied to line 7 but it will be understood that the system may be utilized for the converse operation by suitable readjustment of the elements thereof. It will also be understood that the controlling elements of the system may also be utilized for controlling the operation of electric valves in systems other than alternating current rectifying or direct current inverting systems.

Line 6 is connected through a suitable switch 9 with the primary widing 11 of a transformer 12 having a secondary winding 13. Winding 13 is provided with a plurality of taps, including a midtap connected with one conductor of line 7, and a plurality of pairs of equidistant taps severally connected with contacts 14, 16 and 17 of a tap changer 18 having further contacts 19 thereof severally connected with the anodes 21 of valve 8. As will be explained hereinafter, the contacts of the tap changer are not utilized for interrupting the flow of current therethrough, and tap changer 18 may be of any suitable, simple and inexpensive type such as the drum type provided with suitable conductive segments 22 engaging with the several contacts thereof.

The flow of current through valve 8 is controlled by means of control electrodes 23 which may each be of any suitable type operable for periodically igniting a discharge of a cathode associated with an anode, or for periodically releasing the flow of current between the associated anode and a continuously excited cathode. Such control electrodes are energized by suitable means differing with the type of control electrodes utilized, which will be assumed as being of the type for periodically releasing current flow and as being associated with a cathode 24 connected with line 7. Valve 8 is also provided with suitable discharge igniting and maintaining means which are well known and therefore not shown.

Line 7 is utilized for supplying current to any suitable current consuming means which may be of inductive character; in any event it is preferable to insert inductive means such as a reactor 26 in the output circuit of the system. The flow of current through each anode 21 of the valve, which flow occurs during the positive period of the anode voltage, then continues during intervals of negative voltage as a result of the action of the reactor which tends to maintain the current through the valve at a uniform value. The output voltage of the valve is then decreased in proportion to the extent of such interval of negative voltage, with the result that the voltage may be regulated down to the value zero even when the flow of current is released through each anode at a time materially prior to the passage of the anode voltage from positive values to negative values.

Each control electrode is connected through a resistor 27 and another resistor 28 with the negative terminal of a suitable source of direct current such as a battery 29. The potentials of the terminals of battery 29 are maintained in invariable relation with the potential of cathode 24 by connecting the cathode with an intermediate tap of a voltage divider 31 connected with the terminals of battery 29. The control electrodes are also connected with the positive terminal of the battery through resistors 27 and through pairs of segments 32, 33, 34 or 36 of an interlock drum 37 driven conjointly with tap changer 18, and through pairs of segments 38, 39, or 40 of a distributor 41 having the brush 42 thereof connected with the positive terminal of the battery.

Brush 42 is driven at a speed in relation with the voltage cycle of line 6 by a synchronous motor 43 having a split phase armature connected with the line and having a field 44 provided with a plurality of circumferentially spaced windings 45, 46 and 47. Such windings are variably energized from battery 29 through a voltage divider 48 and through segments 49, 51, 52 and 53 of a controller 54 to vary the momentary position to which armature 44 returns at any predetermined instant of the voltage cycle of line 6 during rotation thereof. Segments 49 and 53 may be provided with steps engaging with a plurality of contacts severally connected with different points of voltage divider 48 to thereby vary the distribution of current in windings 44, 45 and 46 in discrete steps but it will be understood that the segments may also be made of uniform width and may directly engage with voltage divider 48 to cause such distribution of current to be changed in a substantially gradual manner upon movement of the controller. Controller 54 is provided with further segments 56 and 57 cooperating with segments 58 to 67 of drum 37 to control the connection of the field winding 68 of a motor 69 with one or with the other terminal of battery 39. Motor 69 is provided with an armature 71 connected with one terminal of battery 39, the other terminal of the field winding and of the armature being connected with the tap of voltage divider 31. Motor 69 drives tap changer 18 and drum 37 through any suitable transmission means but the tap changer and the drum are mechanically connected in a rigid manner and are herein shown as rotating in opposite directions only to simplify the layout of the connections.

In operation, line 6 being energized, upon closure of switch 9, transformer 12 becomes energized and the several terminals of winding 13 deliver voltages suitable for causing the alternate flow of current through anodes 21 upon connection therewith. Motor 43 may be started in any suitable manner known in the art and synchronized to drive brush 42 at the rate of one revolution per cycle of the voltage of line 6. It will be understood that the flow of current through valve 8 may be initiated at any desired voltage by initially moving controller 54 into the proper position thereof, but the operation of the system will be described assuming that the controller is initially in the position shown to start the energization of line 7 at slightly above zero voltage. Control electrodes 23 are then generally maintained at a negative voltage with respect to cathode 24 as a result of the connection thereof with battery 29, and the connection of voltage divider 48 with segments 29 and 53 is such that brush 42 momentarily engages with each segment 38 towards the end of the positive half cycle of the voltage of the corresponding anode.

Upon movement of controller 54 to position one thereof, the connection of voltage divider 48 remains unchanged. The controller then establishes a circuit from the tap of voltage divider 31 through field winding 68, segments 66 and 67 and segments 63 and 59 to the negative terminal of the battery. As the armature 71 of motor 69 was already energized the motor rotates and drives tap changer 18 and drum 37 to position 1 thereof, at which position the circuit of field 68 is opened at contact 63 and the motor stops. The anodes 21 are then connected with the taps 14 of winding 13 to receive therefrom a portion of the maximum voltage of the winding. Toward the end of the positive half cycle of the voltage of each anode the associated control electrode is momentarily energized at a positive voltage from the positive terminal of battery 39 through brush 42, a segment 38, segments 33 and 32 and resistor 27. The flow of current through valve 8 is thus released at a voltage which may have any desired relation with the magnitude of the voltage of taps 14 depending upon the initial adjustment of voltage divider 48 and of segments 49 and 53.

Movement of controller 54 to the second position thereof only varies the connection of the voltage divider 48 to change the distribution of the flow of current in windings 45, 46 and 47. Such change causes armature 44 to lead, by a constant angle, the position of such armature previously obtained in time, to thereby advance the times of positive energization of control electrodes by engagement of brush 42 with segments 38. The flow of current through each anode 21 is thus released at an earlier time in the voltage cycle thereof and the output voltage of the system is increased to a corresponding extent. Such action is repeated upon movement of controller 54 to positions three and four thereof, the adjustment of the controller being preferably such that, in the position four, the flow of current through each anode is released when such anode becomes positive with respect to the previously operating anode, whereby the output voltage of valve 8 becomes the maximum voltage obtainable when the anodes are connected with contacts 14 of the tap changer. Such position may of course be reached by a number of steps greater than four or, as pointed out above, by a gradual adjustment of voltage divider 48 without steps to thereby control the output voltage of the valve in a gradual manner.

Controller 54 is herein shown as being so arranged that, during the passage from the fourth to the fifth positions thereof, an intermediate position is reached in which the connections of voltage divider 48 are not changed but in which field winding 68 is energized through segments 56 and 57 of the controller and segments 62 and 59 of drum 37, whereupon motor 69 moves tap changer 18 and drum 37 to the second position thereof; in such position the circuit of field 68 is opened at contact 62 and the motor stops. Such movement of motor 69 results in the sequential occurrence of four distinct switching operations: (1) Segments 33 open the connection of control electrodes 23 with segments 38 of distributor 41, so that the control electrodes are continuously maintained at a negative voltage from battery 29 and cause interruption of all flow of current through valve 8 and through tap changer 18. (2) Contact 14 disengages from segment 22. (3) Contacts 16 engage with segments 22, whereby winding 13 impresses voltages on anodes 21 which are materially higher than the voltages previously impressed on the anodes through contacts 14. (4) Control electrodes 23 are connected with segments 39 of distributor 41 through segments 32 and 34 of drum 37. The control electrodes, which immediately before the switching operation were positively energized towards the beginning of the positive voltage half cycle of the associated anodes, are then again energized toward the end of such positive half cycle whereby the flow of current through the anode is released at a voltage which is less than the maximum voltage obtainable during connection of the anode with tap 16. By a suitable choice of the magnitude of the voltage steps of tap changer 18 and by suitable arrangement of the segments of distributor 41 the result may be obtained that the output voltage of the system then returns to substantially the value of such output voltage immediately before the switching operation designated above by numeral 1. The tap changing operation is thus completed without causing the appearance of undesirable voltage surges in line 7. Controller 54 may then be moved from the intermediate position to position five, such movement causing the connection of voltage divider 48 to be varied in the manner above described to cause the energization of the control electrodes to be advanced to thereby increase the output voltage of valve 8 above the value thereof obtained previous to the tap changing operation. Further movement of controller 54 to positions six and seven causes the flow of current through valve 8 to occur at voltages reaching the maximum value obtainable with the connection of anodes 21 with taps 16 of winding 13.

Controller 54 is shown so arranged that the passage from position seven to position eight occurs without any intermediate step. Movement of controller 54 to position eight energizes field winding 68 through segments 56 and 57 and through segments 61 and 59 of drum 37 whereupon motor 69 brings tap changer 18 and drum 37 to the third position thereof. The circuit of field 68 is then interrupted at segment 61 and motor 59 stops. During such motion, the connection of the control electrodes with contacts 39 of distributor 41 are opened at segments 34, whereby the flow of current through valve 8 is interrupted. Anodes 21 are thereafter disconnected from winding 13 at contacts 16 and are reconnected with the winding through contacts 17 whereby the maximum voltage of winding 13 is impressed on the anodes. The control electrodes are then connected with segments 40 of distributor 41 through contacts 36, whereby the times of energization of the control electrodes during the cycle are again retarded to cause the output voltage of valve 8 to remain at substantially the value of such voltage immediately before movement of the tap changer. Movement of controller 54 to position eight also varies the connection of voltage divider 48 with segments 49 and 53 so that the output voltage of valve 8 is immediately increased to an extent which in any case will be less than the increase resulting only from movement of tap changer 18 over one step thereof. Movement of controller 54 to the position nine thereof then causes the system to energize line 7 at the maximum voltage consistent with the arrangement of windings 11 and 13.

The arrangement of the segments of controller 54 between steps four and five and between steps seven and eight has been shown and described as being effected in two different manners but it will be understood that the passage of the system through both of the tap changing steps may be effected in either of the two manners described and that additional steps may be provided in any number if so desired. The segments of distributor 41 may also be so arranged that, after movement of tap changer 18 and of drum 37 over one step thereof, the voltage of valve 8 is not returned to the value of such voltage immediately prior to the tap changing operation but is given a predetermined increase even if the connection of voltage divider 49 remains unchanged during such operation. The operation of the system when controller 54 is returned to the zero position thereof will readily be deduced from the above description by any one skilled in the art.

In a system operating as above described, therefore, the intermittently conductive valve 8 and transformer 12 constitute an electric translation system including an inductive winding 13, in which tap changer 18 controls the connection of valve 8 in the system by varying the connection of such valve with winding 13, to thereby control the output voltage of the system in steps of predetermined value. Battery 29 constitutes the source of control voltages for control electrodes 23 and cooperates with distributor 41, drum 37, voltage divider 48 and controller 54 to control the conductivity of valve 8 and thereby control the flow of current therethrough at voltages within substantially the limit of a voltage step of the tap changer. Such elements also cause interruption of such flow of current during operation of tap changer 18. Drum 37 changes the adjustment of distributor 41 to momentarily interrupt the flow of current through valve 8 and thereafter control the magnitude of the output voltage of the system within the limits of a step of winding 13 adjacent the previously utilized step. Controller 54 coordinately controls the operation of drum 37 and of tap changer 18 operating simultaneously to adjust the output voltage of the system at substantially equal values immediately before and immediately after operation of tap changer 18, as during movement of controller 54 from position four to position five. The controller may also control the alternate operation of distributor 41 operating alone and of distributor 41 with tap changer 18 and drum 37 operating simultaneously whereby the output voltage of the system is varied by less than the amount of one step of tap changer 18, as is obtained during movement of controller 54 from position seven to position eight thereof.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, an intermittently conductive electric valve, means for controlling the connection of said valve in said system, means for controlling the conductivity of said valve and cooperating with the first said means to regulate the magnitude of the voltage of the flow of current through said valve and to render said valve non-conductive during operation of the first said means, and means for causing the coordinate operation of the first and second said means.

2. In an electric translating system, an intermittently conductive electric valve, means for controlling the connection of said valve in said system to control the output voltage of said system in steps of predetermined values, means for controlling the conductivity of said valve and cooperating with the first said means to control the flow of current through said valve within substantially the limits of said steps and operable to cause interruption of the flow of current through said valve during operation of the first said means, and means for causing the coordinate operation of the first and second said means.

3. In an electric translating system, an intermittently conductive electric valve, means for controlling the connection of said valve in said system to control the output voltage of said system in steps of predetermined values, means for controlling the conductivity of said valve and cooperating with the first said means to control the flow of current through said valve within substantially the limits of said steps and operable to cause interruption of the flow of current through said valve during operation of the first said means, and means for causing the coordinate operation of the first and second said means.

4. In an electric translating system, an intermittently conductive electric valve, means for controlling the connection of said valve in said system to control the output voltage of said system in steps of predetermined values, means for controlling the conductivity of said valve and cooperating with the first said means to control the flow of current through said valve within substantially the limits of said steps and operable to cause interruption of the flow of current through said valve during operation of the first said means, and means for simultaneously controlling the operation of the first and second said means to adjust the output voltage of said system at substantially equal values immediately before and immediately after operation of the first said means.

5. In an electric translating system, an intermittently conductive electric valve, an inductive winding connectable with said valve, means for controlling the connection of said valve with said winding, means for controlling the conductivity of said valve and cooperating with the first said means to control the flow of current through said valve and operable to cause interruption of the flow of current through said valve during operation of the first said means, and a controller movable to and from a plurality of positions to control thereat the said controlling operations of the first and second said means.

6. In an electric translating system, an intermittently conductive electric valve, a transformer connectable with said valve, switch means for varying the connection of said valve with said transformer, means for controlling the conductivity of said valve and cooperating with the first said means to control the flow of current through said valve and operable to cause interruption of the flow of current through said valve during operation of the first said means, and means for causing the simultaneous operation of the first and second said means.

7. In an electric translating system, an electric valve having an anode with an associated control electrode and a cathode, a transformer connectable with said valve, a tap changer for variably connecting said valve with said transformer, a source of control voltages for said control electrodes, means for impressing control voltages from said source between said control electrode and said cathode and effective to variably control the flow of current through said valve and to cause interruption thereof during operation of said tap changer, and a controller operable to cause the coordinate operation of said means and of said tap changer.

8. In an electric translating system, an electric valve having an anode with an associated control electrode and a cathode, a transformer connectable with said valve, a tap changer for variably connecting said valve with said transformer to control the magnitude of the output voltage of said system in steps of predetermined magnitudes, a source of control voltages for said control electrodes, means for impressing control voltages from said source between said control electrode and said cathode and effective to variably control the magnitude of the output voltage of said system within substantially the limits of any one of said steps and to cause interruption of the flow of current through said system during operation of said tap changer, and a controller operable to cause the coordinate operation of said means and of said tap changer.

9. In an electric translating system, an electric valve having an anode with an associated control electrode and a cathode, a transformer connectable with said valve, a tap changer for variably connecting said valve with said transformer, a source of control voltages for said control electrode, means for impressing a control voltage from said source between said control electrode and said cathode and effective to cause interruption of the flow of current through said valve, and a controller operable to cause simultaneous operation of said tap changer and of the said means.

10. In an electric translating system, an electric valve having an anode with an associated control electrode and a cathode, a transformer connectable with said valve, a tap changer for variably connecting said valve with said transformer, a source of control voltages for said control electrode, means for impressing control voltages from said source between said control electrode and said cathode and effective to variably control the flow of current through said valve, means for impressing a control voltage from said source between said control electrode and said cathode and effective to cause interruption of the flow of current through said valve, and a controller operable to cause simultaneous operation of said tap changer and of the second said means.

11. In an electric translating system, an electric valve having an anode with an associated control electrode and a cathode, a transformer connectable with said valve, a tap changer for variably connecting said valve with said transformer to control the magnitude of the output voltage of said system in steps of predetermined magnitudes, a source of control voltages for said control electrode, means for impressing control voltage from said source between said control electrode and said cathode and effective to variably control the magnitude of the output voltage of said system within substantially the limits of any one of said steps, means for impressing a control voltage from said source between said control electrode and said cathode and effective to cause interruption of the flow of current through said valve, and a controller operable to cause simultaneous operation of said tap changer and of the second said means.

12. In an electric translating system, an electric valve having an anode with an associated control electrode and a cathode, a transformer connectable with said valve, a tap changer for variably connecting said valve with said transformer to control the magnitude of the output voltage of said system in steps of predetermined magnitudes, a source of control voltages for said control electrode, means for impressing control voltage from said source between said control electrode and said cathode and effective to variably control the magnitude of the output voltage of said system within substantially the limits of any one of said steps, means for impressing a control voltage from said source between said control electrode and said cathode and effective to cause interruption of the flow of current through said valve, and a controller operable to cause alternate operation of said tap changer and of the second said means operating simultaneously and of the first said means.

13. In an electric translating system, an electric valve having an anode with an associated control electrode and a cathode, a transformer connectable with said valve, a tap changer for variably connecting said valve with said transformer to control the magnitude of the output voltage of said system in steps of predetermined magnitudes, a source of control voltages for said control electrode, means for impressing control voltages from said source between said control electrode and said cathode and effective to variably control the magnitude of the output voltage of said system within substantially the limits of any one of said steps, means for changing the adjustment of said means to momentarily cause interruption of the flow of current through said valve and thereafter control the magnitude of the output voltage of said system within the limits of a step adjacent said one of said steps, and a controller operable to cause alternate operation of said tap changer and of the second said means operating simultaneously and of the first said means whereby the output voltage of said system is maintained at substantially the same value immediately before and immediaely after operation of said tap changer.

14. In an electric translating system, an electric valve having an anode with an associated control electrode and a cathode, a transformer connectable with said valve, a tap changer for variably connecting said valve with said transformer to control the magnitude of the output voltage of said system in steps of predetermined magnitudes, a source of control voltages for said control electrode, means for impressing control voltages from said source between said control electrode and said cathode and effective to variably control the magnitude of the output voltage of said system within substantially the limits of any one of said steps, means for changing the adjustment of said means to momentarily cause interruption of the flow of current through said valve and thereafter control the magnitude of the output voltage of said system within the limits of a step adjacent said one of said steps, and a controller operable to cause alternate operation of said tap changer and of the first and second said means operating simultaneously and of the first said means alone whereby the output voltage of said system is varied by less than the amount of one of said steps by operation of said tap changer over one step thereof.

15. An electric translating system including a variably conductive electric valve, means for controlling the connection of said valve in said system, means for controlling the conductivity of said valve, and means interlocking the first said means with the second said means for controlling the operations of each thereof in such sense as to adjust the output voltage of said system at substantially equal values immediately before and immediately after operation of the first said means.

16. An electric translating system including a variably conductive electric valve, means for controlling the connection of said valve in said system to control the output voltage of said system in steps of predetermined values, means for controlling the conductivity of said valve, and means interlocking the first said means with the second said means for controlling the operations of each thereof in such sense as to adjust the output voltage of said system within substantially the limits of said steps and to adjust the magnitude of said voltage at values differing by less than the amount of one of said steps immediately before and immediately after operation of the first said means.

17. An electric translating system including a variably conductive electric valve, means for controlling the connection of said valve in said system to control the output voltage of said system in steps of predetermined values, means for controlling the conductivity of said valve and cooperating with the first said means to adjust the output voltage of said system within substantially the limits of said steps, and means interlocking the first and second said means for simultaneously controlling the actions thereof in such sense as to adjust the output voltage of said system at values differing by materially less than the amount of one of said steps immediately before and immediately after operation of the first said means.

18. An electric translating system including a variably conductive electric valve, a transformer for connecting said valve in said system, means for varying the connections of said transformer, means for controlling the conductivity of said valve, and means interlocking the first said means with the second said means and controlling the operations of each thereof in such sense as to adjust the output voltage of said system at substantially equal values immediately before and immediately after operation of the first said means.

19. An electric translating system including a variably conductive electric valve, a transformer for connecting said valve in said system, means for varying the connections of said transformer to control the output voltage of said system in steps of predetermined values, means for controlling the conductivity of said valve, and means interlocking the first said means with the second said means and controlling the operations of each thereof in such sense as to adjust the output voltage of said system within substantially the limits of said steps and to adjust the magnitude of said voltage at values differing by less than the amount of one of said steps immediately before and immediately after operation of the first said means.

20. An electric translating system including a variably conductive electric valve, a transformer for connecting said valve in said system, means for varying the connections of said transformer to control the output voltage of said system in steps of predetermined values, means for controlling the conductivity of said valve and cooperating with the first said means to adjust the output voltage of said system within substantially the limits of said steps, and means interlocking the first said means with the second said means for simultaneously controlling the actions of each thereof to adjust the output voltage of said system at values differing by materially less than the amount of one of said steps immediately before and immediately after operation of the first said means.

21. An electric translating system including an electric valve having an anode with an associated control electrode and a cathode, a transformer for connecting said valve in said system, a tap changer for varying the connections of said transformer to control the magnitude of the output voltage of said system in steps of predetermined magnitudes, a source of control voltages for said control electrode, means for impressing voltages from said source between said control electrode and said cathode effective to variably control the magnitude of the output voltage of said system within substantially the limits of said steps, and means interlocking the said tap changer and of the first said means to adjust the output voltage of said system at values differing by materially less than the amount of one of said steps immediately before and immediately after operation of the first said means.

22. An electric translating system including an electric valve having an anode with an associated control electrode and a cathode, a transformer for connecting said valve in said system, a tap changer for varying the connections of said transformer to control the magnitude of the output voltage of said system in steps of predetermined magnitudes, a source of control voltages for said control electrode, means for impressing voltages from said source between said control electrode and said cathode effective to variably control the magnitude of the output voltage of said system within substantially the limits of said steps, and means interlocking the said tap changer with the first said means for simultaneously causing operation of said tap changer and varying the adjustment of the first said means to thereby adjust the output voltage of said system at values differing by materially less than the amount of one of said steps immediately before and immediately after operation of the first said means.

STEFAN WIDMER.